UNITED STATES PATENT OFFICE.

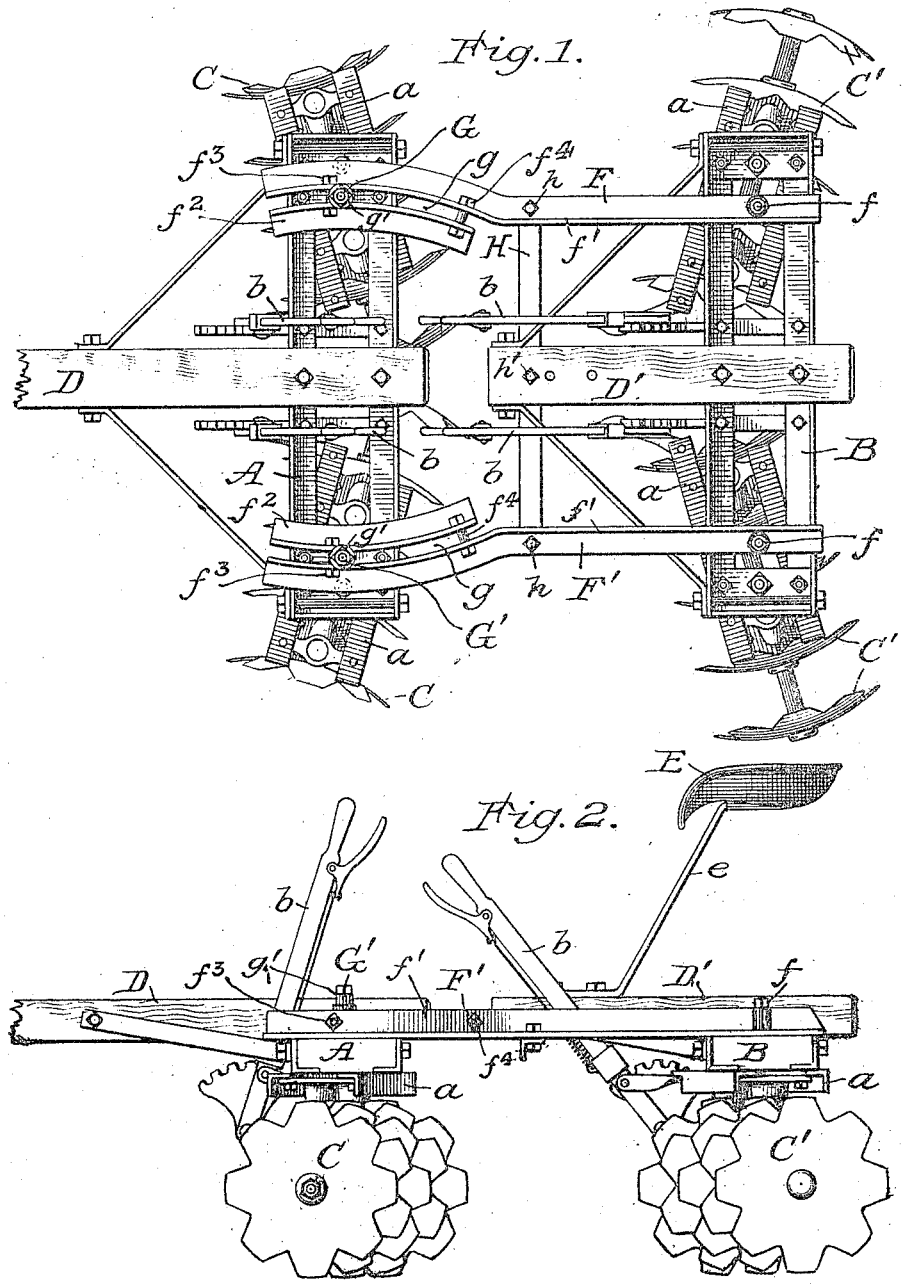

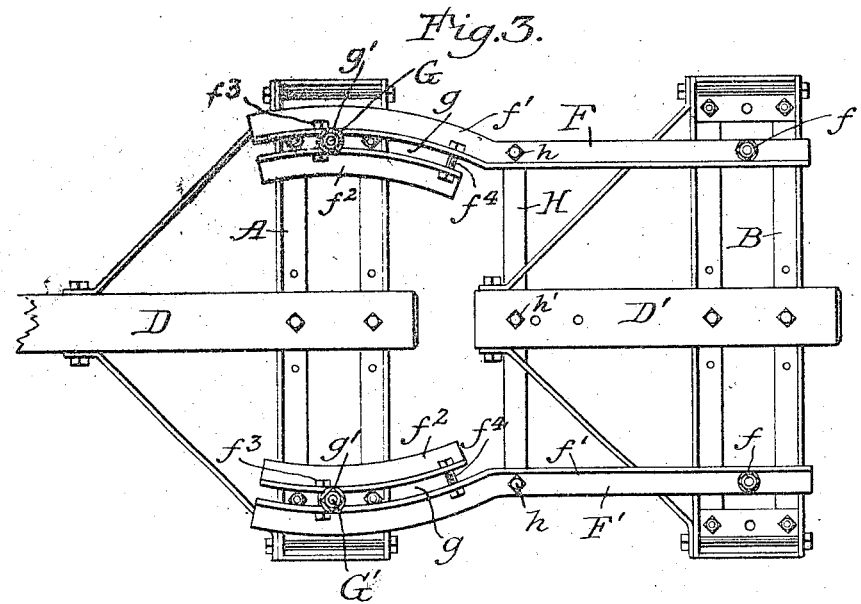
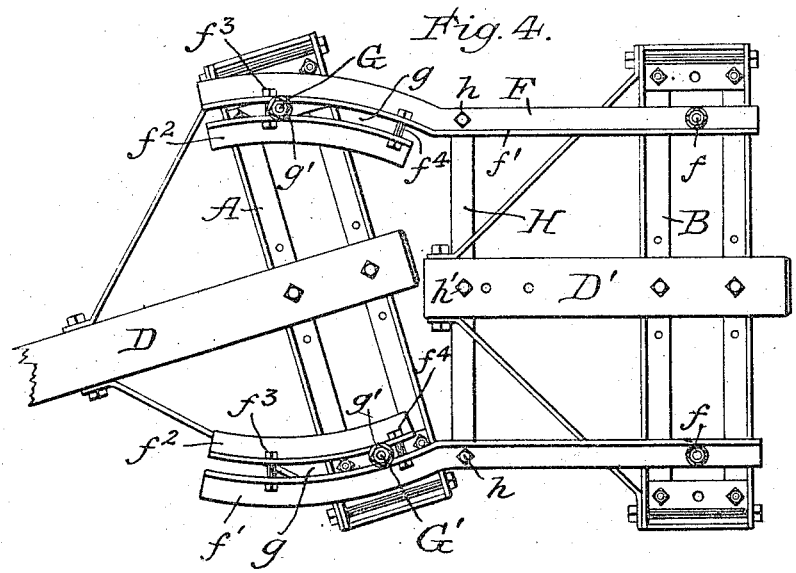

ELMER S. HUBBARD, OF HIGGANUM, CONNECTICUT.

HARROW.

1,138,112.	Specification of Letters Patent.	Patented May 4, 1915.

Application filed January 10, 1914. Serial No. 811,303.

*To all whom it may concern:*

Be it known that I, ELMER S. HUBBARD, a citizen of the United States, residing at Higganum, in the county of Middlesex and State of Connecticut, have invented new and useful Improvements in Harrows, of which the following is a specification.

My invention relates to harrows having two sets or gangs of rotary cutters arranged one in front of the other for cutting and throwing the earth in opposite directions.

The main object of my invention is to obtain the advantages of what is known as the "rigid main frame" double harrow coupled with the advantages of the "flexible or tandem" type of double harrow. The rigid main frame double harrow holds the cutter gangs in substantially rigid positions so that they operate to level the ground, cutting down and pulverizing the hummocks or higher places and carrying the earth to the hollows, the disks or cutters being so set that the disks of the rear gangs will travel between the furrows cut by the disks of the forward gangs. The tandem double harrow is usually made up of two single harrows flexibly connected together so that when the harrow is operating in tough hard-baked soil the rear disks or cutters will swing to one side and travel in the paths or ruts cut by the forward cutters. In this type of double harrow the cutter gangs conform to uneven surfaces and therefore do not operate to level the ground, but the flexible connections between the two harrow frames permit the harrow to turn sharp corners without twisting in the ground, as the rigid main frame machine is inclined to do.

The present invention seeks to retain the advantages of the rigid frame machine by so connecting the frames carrying the front and rear cutters that the said cutters may be held against independent lateral or vertical movement when the machine is traveling forward, but which will permit the frame carrying the forward cutters to swing or move rearwardly at either side of the line of draft to permit the machine to be readily turned. This I accomplish by connecting the two frames together at each side of the line of draft by bars or arms which are preferably rigidly secured to the rear frame, but which are slidably connected to the front frame. Said arms are preferably slotted at their forward ends, the slots being curved outwardly on an arc corresponding to the distance between the slots of the two arms. Bolts passing through said slots and connected to the front frame provide a sliding connection which will permit the front frame to swing with reference to the rear frame, one or the other of the connecting bolts operating as the pivotal connection when the harrow is being turned to the right or left. When at work, the connecting bolts will be drawn to the forward ends of the curved slots in the connecting arms, so that the two frames will be held against lateral movement with respect to each other, and said connecting arms will operate to hold the frames against independent vertical movement.

To more particularly describe my invention, I will refer to the accompanying drawings, in which—

Figure 1 is a top or plan view of a double harrow embodying my invention, the seat and seat post being removed. Fig. 2 is a side elevation thereof. Fig. 3 is a top or plan view showing the front and rear frames and their connections in the positions they occupy when the machine is traveling forward. Fig. 4 is a top or plan view showing the positions of the two frames and their connections when the machine is being turned to the left.

In the construction shown in Figs. 1 and 2, I have employed two single harrows, each consisting of a main frame to which is pivotally secured two gang frames, each of the latter carrying a gang of rotary disks or cutters.

The main frame of the front harrow is designated by the reference letter A, and the main frame of the rear harrow is designated by the reference letter B. The gang frames *a* are each pivotally mounted on the under side of the frames A and B, and are adjusted and held to the desired angular positions in the usual manner by means of hand levers *b*. The disks or cutters C of the forward harrow are arranged to throw the earth outwardly at each side of the central line of draft, while the disks C' of the rear gang are arranged to throw the earth toward the center.

A draft pole D is centrally secured to the front frame A, and the rear frame B carries a stub pole D' on which is mounted a post *e* carrying the driver seat E. The two frames A and B are connected together at each side of the central line of draft by arms F and F', secured at one end to the rear gang frame B by bolts $f$. The forward ends of said arms are provided with outwardly curved slots $g$, said slots being curved on an arc substantially equal to the distance between the slots of the two arms at their forward ends. Said arms are formed of angle irons $f'$ which are curved at their forward ends to form the outer walls of the slots $g$. The inner walls of said slots are formed by a short curved angle iron $f^2$, spaced from the angle iron $f'$ and secured thereto by spacing bolts $f^3$ and $f^4$ forming the front and rear walls of said slots.

Bolts G and G' secured to the front frame A project through the slots $g$ and said bolts are provided with nuts or caps $g'$ which secure the front frame A to said draft arms F and F'. To hold the arms F and F' in proper relation to each other and to the rear frame, said arms are connected together by a bar H which is bolted at each end at $h$ to said arms, and is also bolted to the stub pole D' as shown at $h'$. The arms F and F' are thus held against lateral movement with respect to the rear frame.

From the above description it will be readily seen that when the harrow is traveling forward the bolts G and G' will be drawn to the extreme forward ends of the slots $g$ and operate against the spacing bolts $f^3$ to draw the rear harrow frame, but that when the harrow is to be turned to the right or left, the front frame is permitted to move rearwardly with respect to the rear frame on one side or the other of the line of draft, according to the direction of the turn.

In Fig. 4, I have illustrated the position of the parts when the harrow is being turned to the left, and it will be seen that the front frame has turned to an angular position with the bolt G serving as its pivotal point, while the bolt G' has traveled rearwardly in its slot $g$. When the harrow is to be turned to the right, the front frame turns on the bolt G' as the pivotal point, while the bolt G travels rearwardly in its slot $g$.

It will be seen that when the machine is to be drawn forward, the front and rear frames will be held by the arms F and F' in substantially rigid relations, so long as the bolts G and G' connecting the arms to the frame are properly adjusted. But, should it be desired to provide a certain amount of flexibility the connecting bolts may be loosened, or the two frames may be rigidly locked together by tightening the bolts, as will be readily understood.

The arms F and F' extend over the front frame A so as to bear thereon both in front of and in the rear of the bolts G and G', the front frame being thus held against rocking movement as well as against any substantial independent vertical movement. It will also be seen that the two frames may be absolutely rigidly locked together by means of said bolts G and G'.

Having thus described my invention, what I desire to secure by Letters Patent, is—

1. In a double harrow, the combination of a front and rear frame, each carrying earth working devices, connecting means adapted to hold said frames against independent vertical movement, said means being secured to one of said frames by pivotal connections at each side of the line of draft, and means permitting said frame to swing on either of said pivotal connections toward said other frame.

2. In a double harrow, the combination of a front and a rear frame, each carrying earth working devices, arms rigidly connected to one of said frames at each side of the line of draft, each of said arms being provided with a curved slot at its forward end, and bolts connected to the other of said frames and operating in said slots to form pivotal and sliding connections, said arms bearing on said last mentioned frame both in front of and in the rear of said bolts, substantially as described.

3. In a double harrow, the combination of a front and a rear frame, arms rigidly connected to one of said frames at each side of the line of draft and extending over and resting upon the top of the other of said frames and having slots therein, bolts secured to the other of said frames and operating in said slots to form sliding and pivotal connections, said arms bearing on said last mentioned frame both in front of and in the rear of said bolts, substantially as described.

In testimony whereof I have hereunto set my hand in presence of two subscribing witnesses.

ELMER S. HUBBARD.

Witnesses:
 HOWELL BATTLE,
 PHILIP F. LARNER.